(12) United States Patent
Thomas et al.

(10) Patent No.: US 11,187,098 B2
(45) Date of Patent: Nov. 30, 2021

(54) TURBINE SHROUD ASSEMBLY WITH HANGERS FOR CERAMIC MATRIX COMPOSITE MATERIAL SEAL SEGMENTS

(71) Applicants: Rolls-Royce Corporation, Indianapolis, IN (US); Rolls-Royce High Temperature Composites Inc., Cypress, CA (US)

(72) Inventors: David J. Thomas, Brownsburg, IN (US); Jeffrey A. Walston, Indianapolis, IN (US); Aaron D. Sippel, Zionsville, IN (US); Daniel K. Vetters, Indianapolis, IN (US); Alexandra Baucco, Indianapolis, IN (US); Jeffrey M. Crutchfield, Long Beach, CA (US)

(73) Assignees: Rolls-Royce Corporation, Indianapolis, IN (US); Rolls-Royce High Temperature Composites Inc., Cypress, CA (US)

(*) Notice: Subject to any disclaimer, the term of this patent is extended or adjusted under 35 U.S.C. 154(b) by 38 days.

(21) Appl. No.: 16/723,249

(22) Filed: Dec. 20, 2019

(65) Prior Publication Data

US 2021/0189898 A1 Jun. 24, 2021

(51) Int. Cl.
*F01D 11/08* (2006.01)
*F01D 25/24* (2006.01)
*F01D 25/00* (2006.01)

(52) U.S. Cl.
CPC ............ *F01D 11/08* (2013.01); *F01D 25/005* (2013.01); *F01D 25/246* (2013.01); *F05D 2220/323* (2013.01); *F05D 2230/60* (2013.01); *F05D 2240/11* (2013.01); *F05D 2240/15* (2013.01); *F05D 2250/75* (2013.01); *F05D 2300/6033* (2013.01)

(58) Field of Classification Search
CPC ........ F01D 11/08; F01D 25/005; F01D 25/24; F01D 25/246; F05D 2220/32; F05D 2240/11; F05D 2250/75
See application file for complete search history.

(56) References Cited

U.S. PATENT DOCUMENTS

| 4,759,687 | A | 7/1988 | Miraucourt et al. |
|---|---|---|---|
| 5,957,067 | A | 9/1999 | Doebbeling et al. |
| 6,062,813 | A | 5/2000 | Halliwell et al. |
| 6,904,757 | B2 | 6/2005 | Mitchell et al. |
| 6,932,566 | B2 | 8/2005 | Suzumura et al. |
| 6,942,203 | B2 | 9/2005 | Schroder et al. |
| 7,056,053 | B2 | 6/2006 | Schilling et al. |
| 7,229,246 | B2 | 6/2007 | Ghasripoor et al. |
| 7,237,389 | B2 | 7/2007 | Ryan et al. |
| 7,546,743 | B2 | 6/2009 | Bulman et al. |
| 7,726,936 | B2 | 6/2010 | Keller et al. |
| 8,122,727 | B2 | 2/2012 | Shi et al. |

(Continued)

*Primary Examiner* — Woody A Lee, Jr.
*Assistant Examiner* — Maxime M Adjagbe
(74) *Attorney, Agent, or Firm* — Barnes & Thornburg LLP (57) ABSTRACT

An assembly adapted for use in a gas turbine engine or other engine has a carrier component and a supported component, illustratively used as a heat shield. The assembly includes a mounting system for coupling the supported component to the carrier component. In an illustrative embodiment, the assembly is a turbine shroud segment for blocking gasses from passing over turbine blades included in the gas turbine engine.

16 Claims, 4 Drawing Sheets

(56) References Cited

U.S. PATENT DOCUMENTS

| | | |
|---|---|---|
| 8,303,246 B2 | 11/2012 | Drelon et al. |
| 8,647,055 B2 | 2/2014 | Foster et al. |
| 8,740,552 B2 | 6/2014 | Marusko et al. |
| 8,753,073 B2 | 6/2014 | Albers et al. |
| 8,790,067 B2 | 7/2014 | McCaffrey et al. |
| 8,834,105 B2 | 9/2014 | Albers et al. |
| 8,905,709 B2 | 12/2014 | Dziech et al. |
| 9,127,569 B2 | 9/2015 | Akiyama et al. |
| 9,175,579 B2 | 11/2015 | Franks et al. |
| 9,249,684 B2 | 2/2016 | Lazur et al. |
| 9,593,596 B2 | 3/2017 | Uskert et al. |
| 9,726,043 B2 | 8/2017 | Franks et al. |
| 9,915,153 B2 | 3/2018 | Sener |
| 10,087,784 B2 | 10/2018 | Shapiro et al. |
| 10,138,750 B2 | 11/2018 | McCaffrey et al. |
| 10,196,919 B2 | 2/2019 | O'Leary et al. |
| 2004/0188947 A1 | 9/2004 | Paprotna |
| 2006/0067815 A1 | 3/2006 | Ghasripoor et al. |
| 2009/0123278 A1 | 5/2009 | Audeon et al. |
| 2012/0027572 A1 | 2/2012 | Denece et al. |
| 2014/0127457 A1 | 5/2014 | Hillier |
| 2014/0147266 A1 | 5/2014 | Kramer |
| 2015/0377050 A1 | 12/2015 | Freeman et al. |
| 2016/0097303 A1 | 4/2016 | Baldiga et al. |
| 2016/0290140 A1 | 10/2016 | Thomas et al. |
| 2016/0333715 A1 | 11/2016 | McCaffrey |
| 2017/0101882 A1* | 4/2017 | Sippel ................ F01D 11/005 |
| 2017/0130600 A1 | 5/2017 | Shapiro et al. |
| 2018/0106160 A1* | 4/2018 | Thomas ............... F01D 25/005 |
| 2018/0149030 A1 | 5/2018 | Freeman et al. |
| 2018/0149041 A1 | 5/2018 | Freeman et al. |
| 2018/0149042 A1 | 5/2018 | Freeman et al. |
| 2019/0107001 A1 | 4/2019 | Crutchfield |
| 2019/0107002 A1 | 4/2019 | Crutchfield |

\* cited by examiner

TURBINE SHROUD ASSEMBLY WITH HANGERS FOR CERAMIC MATRIX COMPOSITE MATERIAL SEAL SEGMENTS

FIELD OF THE DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional fasteners such as rivets or bolts may present problems due to thermal expansion and/or material properties of the ceramic matrix composite components.

SUMMARY

The present disclosure may comprise one or more of the following features and combinations thereof.

According to the present disclosure, a turbine shroud segment adapted for use in a gas turbine engine is disclosed. The turbine shroud segment may include a carrier segment comprising metallic materials, a blade track segment comprising ceramic matrix composite materials, and a mounting system configured to couple the blade track segment to the carrier segment. The blade track segment may be formed to include a runner shaped to extend partway around a central axis and an attachment portion that extends radially outward from the runner. The mounting system may include a plurality of braces each formed to include a bracket that engages the attachment portion of the blade track segment and a threaded shaft that extends from the bracket through the carrier segment to couple the blade track segment to the carrier segment.

In illustrative embodiments, the bracket included in each of the plurality of braces may include (i) a first track-location arm that engages the attachment portion of the blade track segment and provides rigid loading points for the blade track segment, (ii) a second track-location arm that engages the attachment portion of the blade track segment opposite the first track-location arm and provides rigid loading points for the blade track segment, and (iii) a reaction panel arranged radially outward of the blade track segment that interconnects the first track-location arm and the second track-location arm. The reaction panel may provide a load path for opposed moment loading applied to the first track-location arm and the second track-location arm by forces urging the blade track segment radially inward during use of the turbine shroud segment in the gas turbine engine.

According to a more general aspect of the present disclosure, an assembly may include a carrier comprising metallic materials, a heat shield component comprising ceramic matrix composite materials, and a mounting system configured to couple the heat shield component to the carrier. The heat shield component may be formed to include a runner configured to face a hot environment, a stem that extends outward from the runner, and an attachment panel that extends from the stem such that the entire heat shield component has an I-beam shape when viewed in cross section. The mounting system may include a plurality of braces each formed to include a bracket that engages the attachment panel of the blade track segment and a shaft that extends from the bracket at least partway into the carrier segment to couple the heat shield component to the carrier.

In illustrative embodiments, the bracket included in each of the plurality of braces can include (i) a first track-location arm that engages the attachment panel of the heat shield component to locate the heat shield component, (ii) a second track-location arm that engages the attachment panel of the heat shield component opposite the first track-location arm to locate the heat shield component, and (iii) a reaction panel arranged between the attachment panel of the heat shield component and the carrier that interconnects the first track-location arm and the second track-location arm. The reaction panel may react loads applied to the heat shield component urging the heat shield component away from the carrier.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
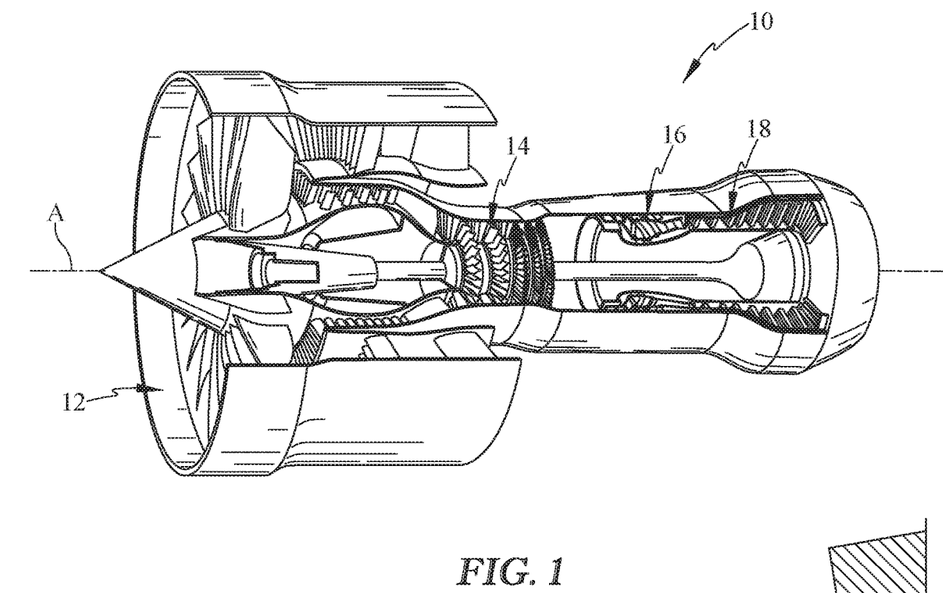
FIG. 1 is a cut-away perspective view of a gas turbine engine showing that the exemplary engine includes a fan driven by an engine core having a compressor, a combustor, and a turbine.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
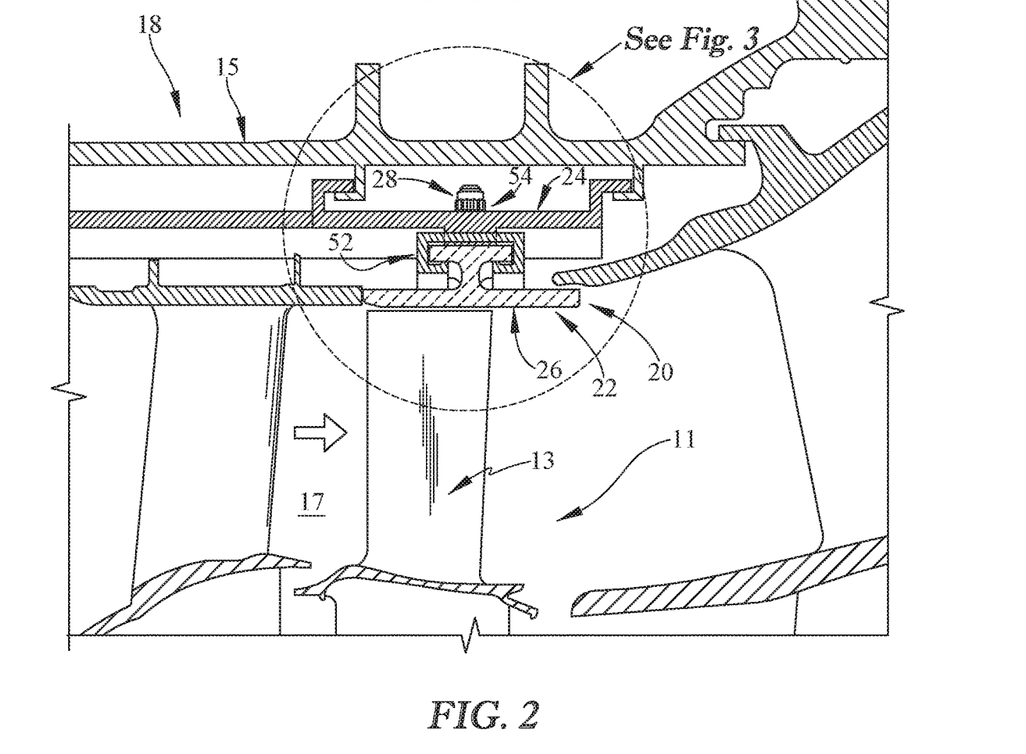
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
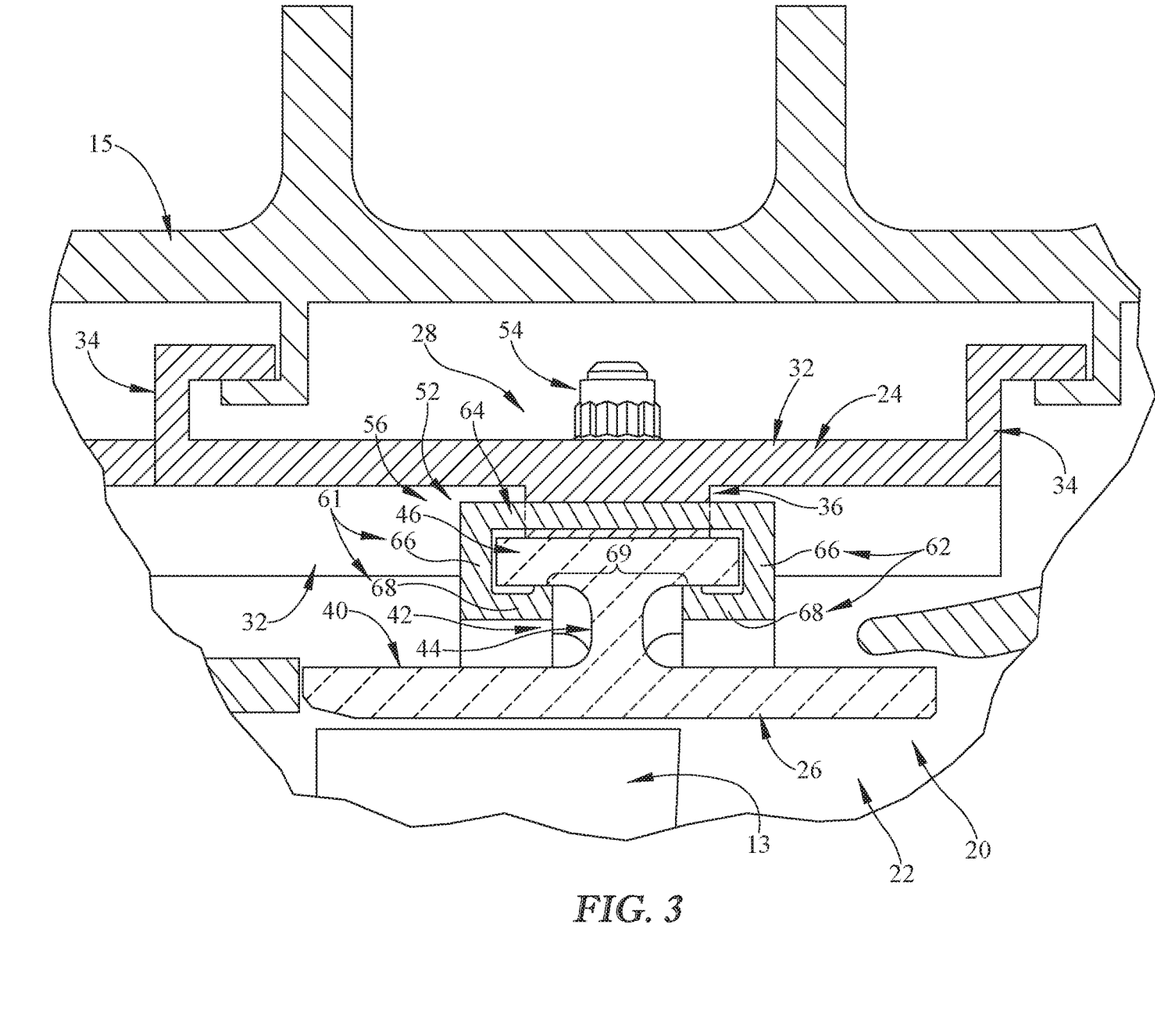
FIG. 3 is a detail view of a portion of FIG. 2 showing a turbine shroud segment that includes a carrier segment, a blade track segment, and a mounting system for coupling the blade track segment to the carrier segment, and showing that the mounting system includes a plurality of braces that engage the blade track segment and that have a threaded stud that extends to the carrier segment.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 2 and 3, that extend only part-way around the central axis A and cooperate to surround the turbine wheel assembly 11. The shroud segments 22 are sealed against one another, such as by strip seal members, to provide a continuous turbine shroud 20. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Each shroud segment 22 includes a carrier segment 24, a blade track segment 26, and a mounting system 28 configured to couple the blade track segment 26 to the carrier segment 24 as shown in FIGS. 2 and 3. The carrier segment 24 is a metallic support component configured to interface with other metallic components spaced from the primary gas path of the engine 10. The blade track segment 26 is a ceramic matrix composite component configured to directly face the high temperatures of the primary gas path. The mounting system 28 is designed to engage the blade track segment 26 so as to distribute mounting and pressure loads.

Figure 6:
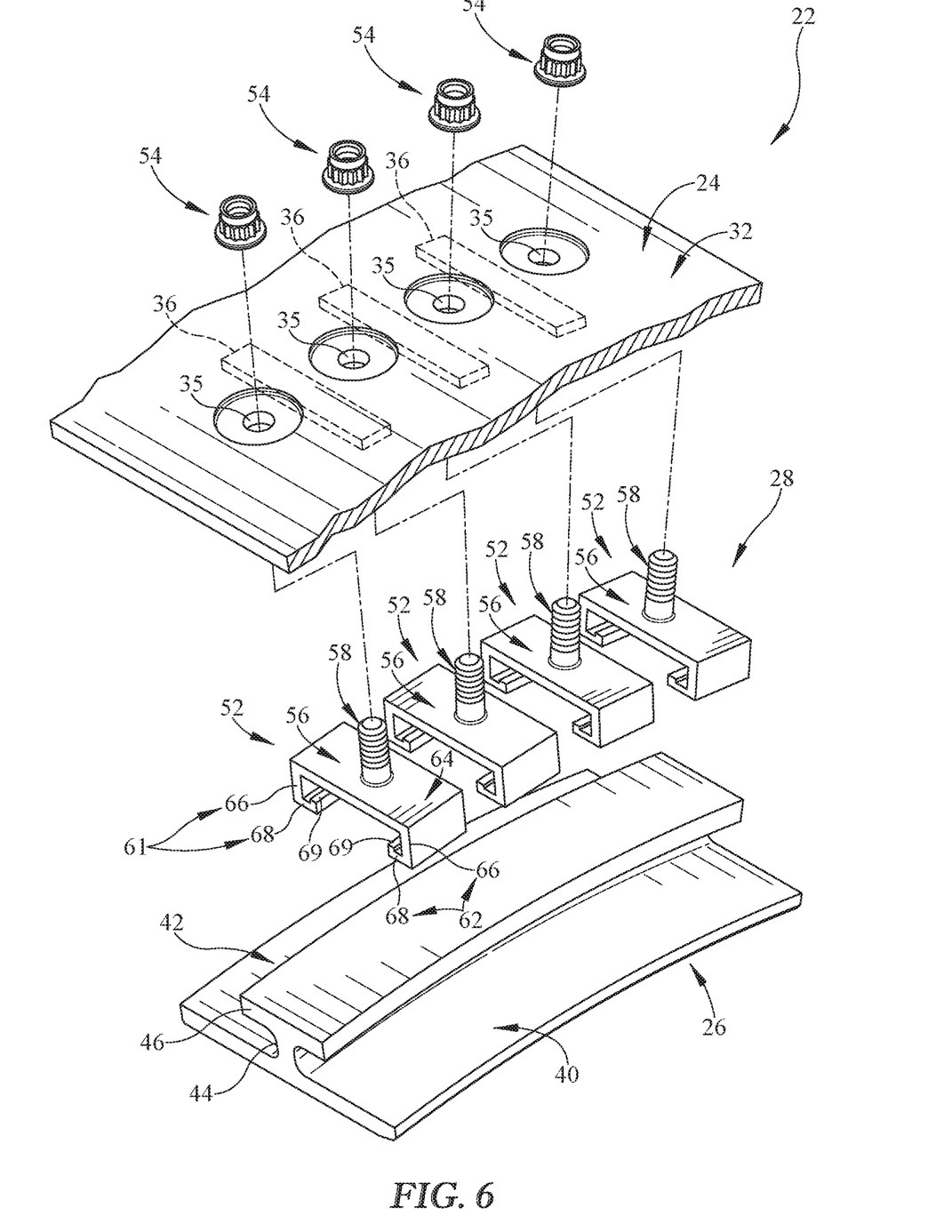
FIG. 6 is an exploded perspective assembly view of the turbine shroud segment of FIGS. 2-3 showing that the mounting system includes a plurality of braces each having a threaded shaft and a bracket that engages the blade track segment.

The carrier segment 24 included in each shroud segment 22 is coupled to the case 15 of the engine 10 as shown in FIG. 2. Each carrier segment 24 illustratively includes a body plate 32, hangers 34, and locating pads 36 as shown in FIGS. 3 and 6. The body plate 32 extends partway around the axis 11 and is formed to include holes 35 through which the mount system 28 extends. The hangers 34 extend radially outward from the body plate 32 and engage the case 15 to couple the turbine shroud segment 22 to the rest of the engine 10. Three locating pads 36 extend radially inward from the body plate 32 and contact the blade track segment 26 to help locate the blade track segment 26 relative to the carrier segment 24. The locating pads 36 may be machined to help place the blade track segment 26 in a desired orientation relative to the carrier segment 24.

The blade tracks segment 26 of each shroud segment 22 comprises ceramic matrix composite materials as suggested in FIGS. 2 and 3. The blade track segment 26 is held in place adjacent to tips of turbine blades 13 to block combustion products from passing over the blades 13 without pushing the blades 13 to rotate as suggested in FIG. 2. The blade track segment 26 is illustratively formed to include a runner 40 and an attachment 42. The runner 40 arcuate and extends partway around axis 11 adjacent to turbine blades 13. The attachment 42 extends radially outward from the runner 40 to provide structure for coupling the blade track segment 26 to the carrier segment 24.

In the illustrative embodiment, the attachment 42 of the blade track segment 26 has a T-shape when viewed in the circumferential direction as such that the entire blade track segment has a generally I-beam shape when viewed in the circumferential direction shown in FIGS. 2 and 3. The attachment (or attachment portion) 42 includes a stem 44 that extends radially outward from the runner 40 and an attachment panel 46 that extends radially forward and aft from the stem 44. In other embodiments, the attachment 42 may be provided by L-shaped hangers, fir-tree shaped members, dovetail members, box shape panels, or other suitable features.

Turning again to the mounting system 28, the system 28 includes a number of braces 52 along with corresponding threaded nuts 54 as shown in FIGS. 3 and 6. The braces 52 are configured to distribute coupling and pressure loads applied to the attachment 42 of the blade track segment 26. The threaded nuts 54 engage the braces 52 to fix the braces 52 in place and to apply coupling load to the blade track segment 26 through the braces 52.

Each brace 52 is substantially similar as indicated in FIG. 6. Each brace 52 includes a bracket 56 and a threaded attachment shaft 58. The bracket 56 engages the blade track segment 26 and the carrier segment 24 to locate and distribute mounting/pressure loads. The threaded shaft 58 of each brace 52 extends from the bracket 56 through the carrier segment 24 into a corresponding threaded nut 54.

The locating pads 36 of the carrier segment 24 are arranged circumferentially between individual braces 52 included in the mounting system 28 as suggested in FIG. 6. The locating pads 36 extend into contact with a radially-outwardly facing surface of the attachment panel 46 included in the blade track segment 26 to radially locate the blade track segment 26.

Each bracket 56 included in a brace 52 includes opposed track location arms 61, 62 and a reaction panel 64 that interconnects the opposed location arms as shown in FIGS. 3 and 6. The first track location arm 61 engages the attachment 42 of the blade track segment 26 and provides rigid loading points for the blade track segment 26. The second track-location arm 62 engages the attachment 42 of the blade track segment 26 opposite the first track-location arm and provides rigid loading points for the blade track segment 26. The reaction panel 64 provides a load path for opposed moment loading applied to the first track-location arm 61 and the second track-location arm 62 by forces urging the blade track segment 26 radially inward during use of the turbine shroud segment 22 in the gas turbine engine 10.

In the illustrated embodiment, the first track-location arm 61 is located primarily forward of the attachment 42 included in the blade track segment 26 and the second track-location arm 62 is located primarily aft of the attachment 42 included in the blade track segment 26 as shown in FIG. 3. The reaction panel 64 extends axially between the first and the second track-location arms 61, 62 at a point radially outward of the attachment 42. In other embodiments, the track location arms 61, 62 may be arranged primarily on circumferentially different sides of the attachment 42 and the reaction panel may extend circumferentially across the attachment 42. In view of this, the first track-location arm 61, the second track-location arm 62, and the reaction panel 64 cooperate to form a C-shape when viewed in cross-section around the axis 11.

Each of the exemplary first track-location arm 61 and the second track-location arm 62 include an axial-stop panel 66 and a radial stop panel 68 as shown in FIGS. 3 and 6. The axial-stop panels 66 are arranged to block axial movement of the attachment panel 46 included in the attachment 42 of the blade track segment 26 to axially locate the blade track segment 26. The axial-stop panel 66 extends radially-inwardly from the reaction panel 64 and the radial-stop panel 68 extends axially from the corresponding axial-stop panel 66 at a location spaced apart from the reaction panel 64. Thus, each track-location arm 61, 62 forms an L-shape when viewed in cross-section around the axis 11.

Figure 5:
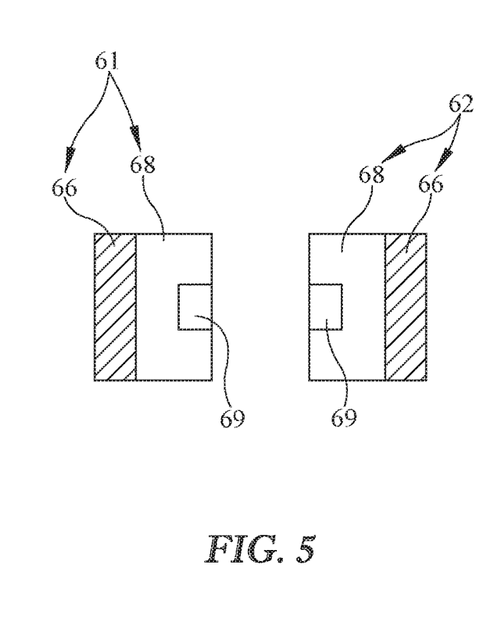
FIG. 5 is a cross-sectional view of one brace included in the mounting system showing that the brace includes two engagement pads configured to contact a corresponding blade track segment.

Each track location arm 61, 62 also include at least one engagement pad 69 as shown in FIGS. 3 and 6. The engagement pad 69 extends radially-outwardly from a corresponding radial-stop panel 68 and into contact with a radially-inwardly facing surface of the attachment panel 46 of the attachment 42 included in the blade track segment 26. In the illustrated embodiment, each track-location arm 61, 62 has only one engagement pad 69 as shown in FIG. 5.

Figure 4:
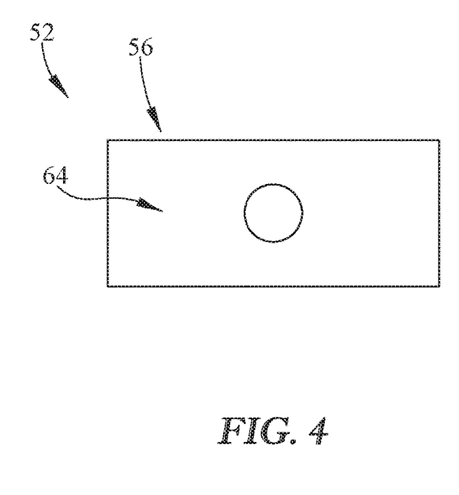
FIG. 4 radially-inwardly looking plan view of one brace included in the mounting system.
Figure 4A:
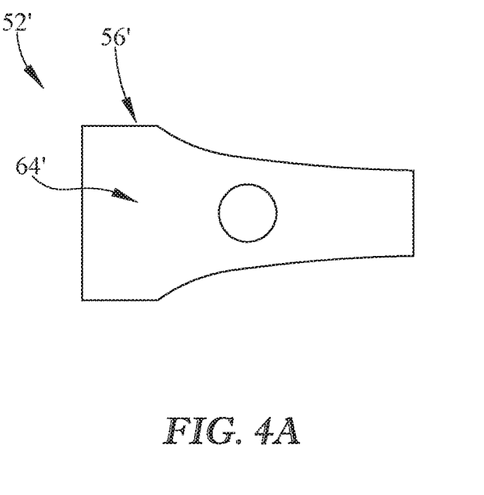
FIG. 4A is a radially-inwardly looking plan view of an alternative brace adapted for use in the mounting system.
Figure 5A:
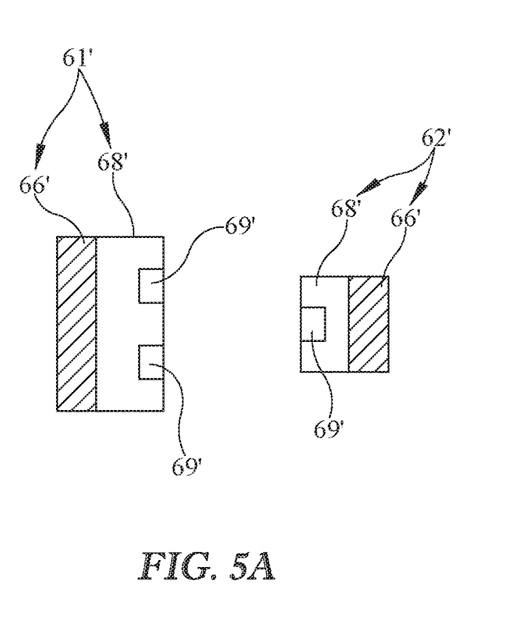
FIG. 5A is a cross-sectional view of the alternative brace from FIG. 4A adapted for use in the mounting system showing that the alternative brace includes three engagement pads configured to contact a corresponding blade track segment.

In an alternative embodiment bracket 56', the first track-location arm 61' includes only two engagement pads 69' and the second track-location arm 62' includes only one engagement pads 69' as suggested in FIGS. 4A and 5A. In such alternatives, each bracket 56' included in a brace 52' can have three points of contact with the blade track segment 26. Designs in accordance with this approach can in some designs be turned/alternated during installation so that a track location arm 61' with two pads 69' included in a first bracket 56' is circumferentially adjacent to a track location arms 62' with one pad 69' included in a second bracket 56'.

Adjustable attachments, such as a bolted hanger system, are herein considered to help accommodate the poor (relative to more conventional turbine engine materials/fabrication processes) surface tolerance of the "as formed" part, which can impact interfaces in the design stack. Using this technique, control of the final placement of the part is transferred from the poorly controlled surface in a hard to reach area (such as the underside of a hanger) to a more accessible area that can be machined to a more tightly controlled tolerance (such as the outer surface of the same hanger).

Embodiments presented herein take advantage of modularity to provide engagement pads 69 (sometimes called load pads), as well as the bridging of the supports via reaction panel 64 to reduce the unwanted rigid body motion. Moreover, designs in accordance with the present disclosure can create a centered load path with opposing moments to help reduce the tendency of the part to rock. The embodiment of FIGS. 4 and 5 shows two engagement pads 69 on each bracket 56. The embodiment of FIGS. 4A and 5A shows how three pads 69' could be used. In such embodiments, brackets 56' could be alternated with two pads 69' on the forward side and one on the downstream side for a first bracket, then one pad 69' on the forward side and two pads on the downstream side for a second bracket 56', and so on.

Concepts in accordance with this disclosure can provide flexibility during assembly. With the modular design of this disclosure, all of the threaded posts 58 can be assembled with a true radial orientation. The embodiments shown with an I-Beam shaped seal segment 26 can provide some desired failure characteristics; such as, in the event of a failed post, the bracket 56 itself remains captured by the top flange of the I-Beam and does not move around unconstrained on the backside of the CMC flow path.

It is contemplated that the mounting system 28 of the present disclosure may be used in other assemblies to couple heat shields (like blade track segments 26) to carrier components (like carrier segment 24). In some such applications, the heat shields may be used in engine/furnace combustors as combustion liners, as insulating panels in engine exhaust passages, and/or as skin-protecting tiles in space craft.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A turbine shroud segment adapted for use in a gas turbine engine, the turbine shroud segment comprising
a carrier segment comprising metallic materials,
a blade track segment comprising ceramic matrix composite materials, the blade track segment formed to include a runner shaped to extend partway around a central axis and an attachment portion that extends radially outward from the runner, and
a mounting system configured to couple the blade track segment to the carrier segment, the mounting system including a plurality of braces each formed to include a bracket that engages the attachment portion of the blade track segment and a threaded shaft that extends from the bracket through the carrier segment to couple the blade track segment to the carrier segment,
wherein the bracket included in each of the plurality of braces includes a first track-location arm that engages the attachment portion of the blade track segment and provides rigid loading points for the blade track segment, a second track-location arm that engages the attachment portion of the blade track segment opposite the first track-location arm and provides rigid loading points for the blade track segment, and a reaction panel arranged radially outward of the blade track segment that interconnects the first track-location arm and the second track-location arm so as to provide a load path for opposed moment loading applied to the first track-location arm and the second track-location arm by forces urging the blade track segment radially inward during use of the turbine shroud segment in the gas turbine engine, wherein the carrier segment includes a body plate that extends partway around the central axis and locating pads that extend axially and are spaced circumferentially around the carrier segment, wherein each locating pad is positioned between a pair of the plurality of braces.

2. The turbine shroud segment of claim 1, wherein the first track-location arm, the second track-location arm, and the reaction panel cooperate to form a C-shape when viewed in cross-section.

3. The turbines shroud segment of claim 1, wherein each of the first track-location arm and the second track-location arm include an axial-stop panel that extends radially-inwardly from the reaction panel and a radial-stop panel that extends axially from the corresponding axial-stop panel at a location spaced apart from the reaction panel.

4. The turbine shroud segment of claim 3, wherein each of the first track-location arm and the second track location arm include at least one engagement pad that extends radially-outwardly from a corresponding radial-stop panel and into contact with the attachment feature of the blade track segment.

5. The turbine shroud segment of claim 4, wherein the attachment portion of the blade track segment has a T-shape when viewed in the circumferential direction with a stem that extends radially outward from the runner and an attachment panel that extends axially forward and aft from the stem such that the entire blade track segment has a generally I-beam shape when viewed in the circumferential direction.

6. The turbine shroud of claim 5, wherein the axial-stop panels of the first track-location arm and the second track-location arm are arranged to block axial movement of the attachment panel included in the attachment portion of the blade track segment to axially locate the blade track segment.

7. The turbine shroud of claim 5, wherein the at least one engagement pad included in each of the first track-location arm and the second track-location arm contacts a radially-inwardly facing surface of the attachment panel included in the attachment portion of the blade track segment to radially locate the blade track segment.

8. The turbine shroud of claim 7, wherein the first track-location arm includes only two engagement pads and the second track-location arm includes only one engagement pad so that each bracket included in a brace has three points of contact with the blade track segment.

9. The turbine shroud of claim 7, wherein the locating pads extend radially inward from the body plate into contact with a radially-outwardly facing surface of the attachment panel included in the blade track segment to radially locate the blade track segment.

10. The turbine shroud of claim 9, wherein the locating pads are arranged circumferentially between individual braces included in the mounting system.

11. A turbine shroud segment adapted for use in a gas turbine engine, the turbine shroud segment comprising a carrier segment comprising metallic materials, a blade track segment comprising ceramic matrix composite materials, the blade track segment formed to include a runner shaped to extend partway around a central axis, a stem that extends radially outward from the runner, and an attachment panel that extends axially forward and aft from the stem such that the entire blade track segment has a generally I-beam shape when viewed in the circumferential direction, and a mounting system configured to couple the blade track segment to the carrier segment, the mounting system including a plurality of braces each formed to include a bracket that engages the attachment panel of the blade track segment and a shaft that extends from the bracket at least partway into the carrier segment to couple the blade track segment to the carrier segment, wherein the bracket included in each of the plurality of braces includes a first track-location arm that engages the attachment panel of the blade track segment to axially and radially locate the blade track segment, a second track-location arm that engages the attachment panel of the blade track segment opposite the first track-location arm to axially and radially locate the blade track segment, and a reaction panel that interconnects the first track-location arm and the second track-location arm to form a single channel, wherein the attachment panel of the blade track segment is received in the single channel, and wherein the carrier segment includes a plurality of circumferentially spaced locating pads, wherein each of the plurality of locating pads is positioned between a pair of the plurality of braces.

12. The turbine shroud segment of claim 11, wherein each of the first track-location arm and the second track-location arm include an axial-stop panel that extends radially-inwardly from the reaction panel and a radial-stop panel that extends axially from the corresponding axial-stop panel at a location spaced apart from the reaction panel.

13. The turbine shroud segment of claim 12, wherein each of the first track-location arm and the second track location arm include at least one engagement pad that extends radially-outwardly from a corresponding radial-stop panel and into contact with an attachment feature of the blade track segment.

14. The turbine shroud segment of claim 11, wherein the carrier segment includes a body plate that extends partway around the axis and locating pads that extend radially inward from the body plate into contact with a radially-outwardly facing surface of the attachment panel included in the blade track segment to radially locate the blade track segment.

15. The turbine shroud segment of claim 11, wherein the carrier includes a body plate that extends partway around an axis and the plurality of locating pads extend axially and are spaced circumferentially around the carrier.

16. An assembly comprising a carrier comprising metallic materials, a heat shield component comprising ceramic matrix composite materials, the heat shield component formed to include a runner configured to face a hot environment, a stem that extends outward from the runner, and an attachment panel that extends from the stem such that the entire heat shield component has an I-beam shape when viewed in cross section, and a mounting system configured to couple the heat shield component to the carrier, the mounting system including a plurality of braces each formed to include a bracket that engages the attachment panel of a blade track segment and a shaft that extends from the bracket at least partway into the carrier segment to couple the heat shield component to the carrier, wherein the bracket included in each of the plurality of braces includes a first track-location arm that engages the attachment panel of the heat shield component to locate the heat shield component, a second track-location arm that engages the attachment panel of the heat shield component opposite the first track-location arm to locate the heat shield component, and a reaction panel arranged between the attachment panel of the heat shield component and the carrier that interconnects the first track-location arm and the second track-location arm to react loads applied to the heat shield component urging the heat shield component away from the carrier, wherein the carrier includes a body plate that extends partway around an axis and locating pads that extend axially and are spaced circumferentially around the carrier, wherein each locating pad is positioned between a pair of the plurality of braces.

\* \* \* \* \*